(12) United States Patent
Divan et al.

(10) Patent No.: US 9,304,522 B2
(45) Date of Patent: Apr. 5, 2016

(54) SYSTEMS AND METHODS FOR DYNAMIC AC LINE VOLTAGE REGULATION WITH ENERGY SAVING TRACKING

(71) Applicants: Deepakraj M Divan, San Jose, CA (US); Anish Prasai, San Jose, CA (US)

(72) Inventors: Deepakraj M Divan, San Jose, CA (US); Anish Prasai, San Jose, CA (US)

(73) Assignee: VARENTEC, INC., Santa Clara, CA (US)

( * ) Notice: Subject to any disclaimer, the term of this patent is extended or adjusted under 35 U.S.C. 154(b) by 0 days.

(21) Appl. No.: 13/867,006

(22) Filed: Apr. 19, 2013

(65) Prior Publication Data

US 2013/0278235 A1 Oct. 24, 2013

Related U.S. Application Data

(60) Provisional application No. 61/635,799, filed on Apr. 19, 2012.

(51) Int. Cl.
*H02M 5/12* (2006.01)
*G05F 1/12* (2006.01)
(Continued)

(52) U.S. Cl.
CPC ............ *G05F 1/12* (2013.01); *G05F 1/253* (2013.01); *H02J 3/18* (2013.01); *H02M 5/12* (2013.01); *H02J 3/12* (2013.01)

(58) Field of Classification Search
CPC .......... H02M 5/14; H02M 2005/2932; H02M 5/293; H02M 5/275; H03B 19/00; H03B 19/16; H02K 47/30; G05F 1/24; G05F 1/26; G05F 1/30; H02J 3/12; H02J 3/16; H02J 3/18; H02J 3/1821
USPC ......... 363/148, 149, 152, 153, 154, 159, 351, 363/253, 126, 370; 323/282
See application file for complete search history.

(56) References Cited

U.S. PATENT DOCUMENTS 4,365,190 A 12/1982 Pasternack et al.
4,737,704 A * 4/1988 Kalinnikov et al. .......... 323/328
(Continued)

FOREIGN PATENT DOCUMENTS

CN 102082438 A1 6/2011
JP 2009254166 A 10/2009
(Continued)

OTHER PUBLICATIONS

Patent Cooperation Treaty International Searching Authority, International Search Report for PCT/US2012/068316, Feb. 7, 2013, pp. 1-2.
(Continued)

*Primary Examiner* — Harry Behm
(74) *Attorney, Agent, or Firm* — Sheppard Mullin Richter & Hampton LLP (57) ABSTRACT

Systems and methods for dynamic AC line voltage regulation are provided. A simple and cost-effective method for achieving AC line voltage regulation in AC systems including split-phase systems, of which the voltage for each voltage line may be regulated over a specified range, is provided. Buck and boost regulation is achieved for lowering or increasing the line voltage, respectively, with reference to the incoming grid voltage. Systems for dynamic AC line voltage regulation may comprise an AC/AC converter which uses fractionally rated switches and magnetics that handle only a fraction of the load current, resulting in lower costs. The use of an AC snubber further provides safe and robust switching of the main switching devices by eliminating failure prone switching sequences that are dependent on accurate assessment of voltage and/or current polarity for AC or bi-directional switches.

15 Claims, 6 Drawing Sheets

(51) Int. Cl.
  *G05F 1/253* (2006.01)
  *H02J 3/18* (2006.01)
  *H02J 3/12* (2006.01)

(56) References Cited

U.S. PATENT DOCUMENTS

| | | | |
|---|---|---|---|
| 4,868,412 | A | 9/1989 | Owens |
| 5,402,057 | A | 3/1995 | D'Aquila et al. |
| 5,563,777 | A | 10/1996 | Miki et al. |
| 5,656,924 | A * | 8/1997 | Mohan ............... H02J 3/01 323/210 |
| 5,686,766 | A | 11/1997 | Tamechika |
| 6,181,113 | B1 | 1/2001 | Hu et al. |
| 6,326,773 | B1 * | 12/2001 | Okuma ............... H02J 3/1807 323/209 |
| 6,573,691 | B2 | 6/2003 | Ma et al. |
| 6,643,112 | B1 | 11/2003 | Carton et al. |
| 7,091,703 | B2 | 8/2006 | Folts et al. |
| 7,149,605 | B2 | 12/2006 | Chassin et al. |
| 7,659,700 | B2 * | 2/2010 | Holveck et al. ............. 323/214 |
| 8,217,618 | B2 * | 7/2012 | Cheng et al. ............. 318/812 |
| 8,545,378 | B2 * | 10/2013 | Peterchev ............. 600/14 |
| 2009/0024255 | A1 | 1/2009 | Penzenstadler et al. |
| 2010/0198422 | A1 | 8/2010 | Feng |
| 2010/0201338 | A1 * | 8/2010 | Haj-Maharsi et al. ........ 323/305 |
| 2010/0231235 | A1 | 9/2010 | Cho |
| 2010/0259100 | A1 | 10/2010 | Hamstra et al. |
| 2011/0074215 | A1 | 3/2011 | Vartanian et al. |
| 2011/0149618 | A1 | 6/2011 | Babcock et al. |
| 2011/0192838 | A1 | 8/2011 | Fujita et al. |
| 2011/0205674 | A1 | 8/2011 | Divan |
| 2011/0285362 | A1 | 11/2011 | Huomo |
| 2012/0262954 | A1 * | 10/2012 | Duvnjak ............. 363/21.02 |

FOREIGN PATENT DOCUMENTS

| | | |
|---|---|---|
| WO | 2005085969 A1 | 9/2005 |
| WO | 2009012399 A2 | 1/2009 |

OTHER PUBLICATIONS

Patent Cooperation Treaty International Searching Authority, International Search Report for PCT/US2012/068307, Feb. 14, 2013, pp. 1-2.
Wilson, Tom, "A Comparison of AdaptiVolt(TM) and Line Drop Compensation Conservation Voltage Regulation Implementation Methodologies", PCS UtiliData, Dec. 2010, pp. 1-7, Spokane, WA.
Patent Cooperation Treaty, International Search Report for PCT/US2012/055619, Dec. 3, 2012, pp. 1-2.
State Intellectual Property Office of PRC, Notification of First Office Action for CN Patent Application No. 201280056392.2, Dec. 25, 2014, pp. 1-2.
State Intellectual Property Office of PRC, Notification of First Office Action for CN Patent Application No. 2012800691846, Feb. 6, 2015, pp. 1-2.
European Patent Office, Extended European Search Report for EP Patent Application No. 12831757.5, Feb. 27, 2015, pp. 1-3.
European Patent Office, Extended European Search Report for EP Patent Application No. 12855569.5, Jul. 28, 2015, pp. 1-8.

* cited by examiner

SYSTEMS AND METHODS FOR DYNAMIC AC LINE VOLTAGE REGULATION WITH ENERGY SAVING TRACKING

CROSS-REFERENCE TO RELATED APPLICATIONS

This application claims benefit of U.S. Provisional Patent Application No. 61/635,799, filed on Apr. 19, 2012, entitled "Systems and Methods for Dynamic AC Line Voltage Regulation with Energy Saving Tracking", which is hereby incorporated herein by reference in its entirety.

TECHNICAL FIELD

The present invention(s) relate generally to regulating voltages in an electric power system. More particularly, the invention(s) relate to dynamic AC line voltage regulation with energy saving tracking.

DESCRIPTION OF THE RELATED ART

An electric power system is a network of interconnected electrical equipment that generate, transmit, and consume electric power. Electric power is delivered to consumers through a transmission network and a distribution network from generators to consumers. The transmission network and the distribution network are often known as the transmission grid and the distribution grid, respectively. As the electric power system is highly dynamic, dynamic voltage regulation ensures the electric power system's reliability and increases its capacity and efficiency. Voltage regulation is the ability of an electric power system to provide near constant voltage over a wide range of load conditions. A voltage regulator provides such voltage regulation. Voltage regulators may be installed at a substation or along distribution lines so that all loads receive steady voltage regardless of the amount of power drawn.

Conventionally, a tapped auto-transformer with relays to select a desired voltage level is used prevalently. Typical control range is +/−15% around the input value, possibly with additional taps. While inexpensive, this approach suffers from many drawbacks, such as slow response time, the possibility of momentary load interruption during transitions, and very coarse voltage steps. The use of a triode for Alternating Current (triac) or a thyristor pair to switch the windings can yield faster response, but still results in coarse control and significant power losses, maybe higher than 1-2% of the power handled.

BRIEF SUMMARY OF EMBODIMENTS OF THE INVENTION

According to various embodiments of the invention, systems and methods for dynamic AC line voltage regulation are provided. Various embodiments provide a simple and cost-effective method for achieving AC line voltage regulation in AC systems including split-phase systems, of which the voltage for each line may be regulated over a specified range. Buck and boost regulation is achieved for lowering or increasing the line voltage, respectively, with reference to the incoming grid voltage.

Various embodiments comprise an AC/AC converter which uses fractionally rated switches and magnetics that handle only a fraction of the load current, resulting in lower costs. The use of an AC snubber further provides safe and robust switching of the main switching devices by eliminating failure prone switching sequences that are dependent on accurate assessment of voltage and/or current polarity for AC or bi-directional switches. In addition, a dynamic AC line voltage regulator may be isolated from system or internal faults. Such fail-safe operation is achieved through a bypass or 'fail-normal' switch comprised of a combination of a thyristor pair (or triac) and a relay.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Fast control of ac line voltage is becoming increasingly important, as it can present the basis for controlling the alternating current (AC) line voltage and in turn controlling power drawn by the load as well as the energy consumed over a certain time.

Figure 1:
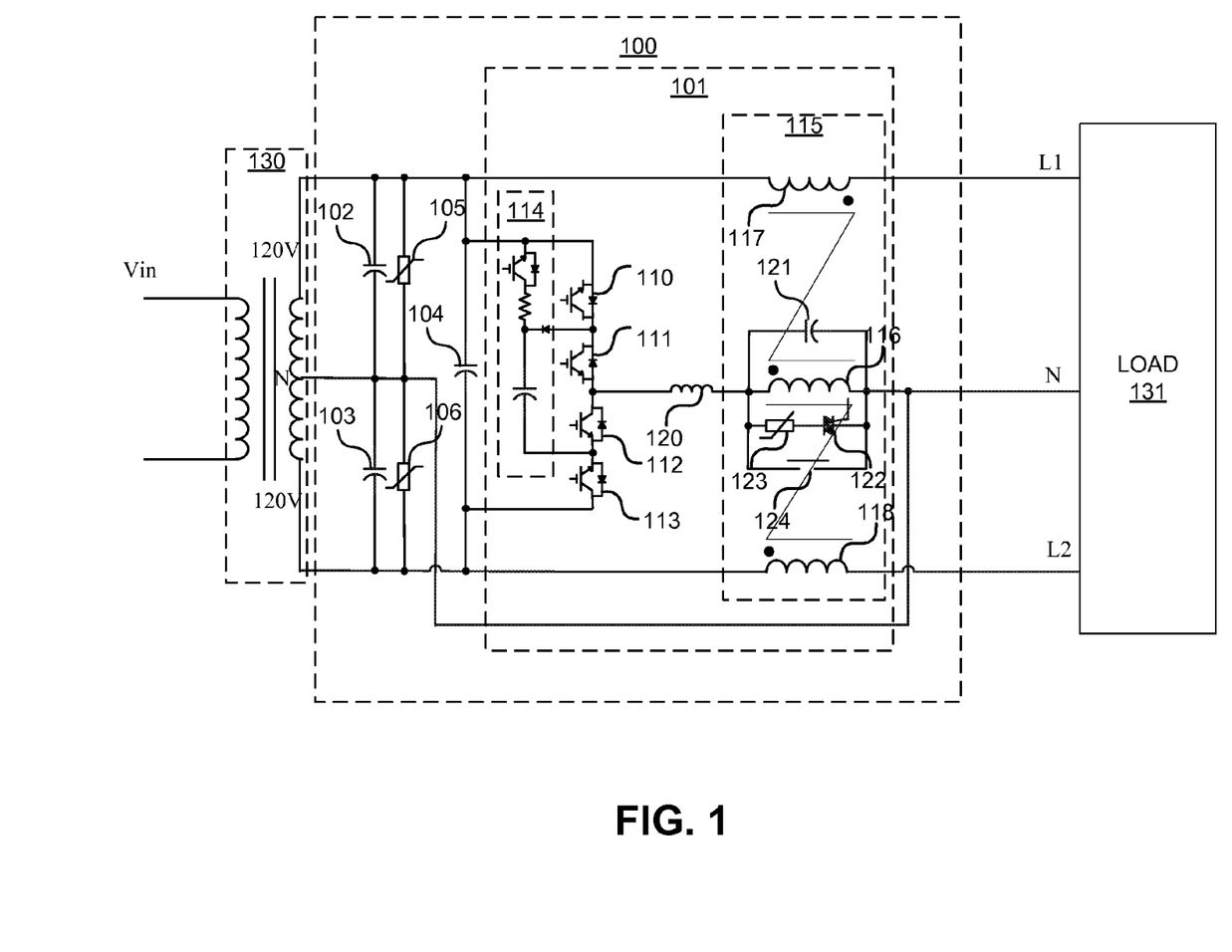
FIG. 1 illustrates an exemplary implementation of a dynamic AC line voltage regulator in accordance with an embodiment of the invention.

FIG. 1 illustrates an exemplary implementation of a dynamic AC line voltage regulator 100 in accordance with an embodiment of the invention. The example dynamic AC line voltage regulator 100 comprises a converter 101, capacitors 102-104, and varistors 105-106. The converter 101 comprises switches 110-113, an active snubber 114, and a transformer 115. The switches 110-113 are AC switches and may be realized using semiconductor switches, such as MOSFETs and IGBTs, both of which have reverse conducting capability. In one embodiment, the switches 110 and 111 are coupled in the common emitter configuration and the switches 112 and 113 are coupled in the common collector configuration.

In the illustrated example, the transformer 115 has windings 116-118: the primary winding 116 is coupled to the neutral line, and the secondary and tertiary windings 117-118 are coupled to the AC lines L1 and L2. In various embodiments, the primary winding 116 may have substantially higher turns than the secondary and tertiary windings 117-118. One end of the primary winding 116 is coupled to the neutral line as shown, while the other end is coupled to the output of the converter which synthesizes an AC voltage to be injected in series with the two lines, L1 and L2, through the transformer 115. Due to the high-low turn ratio of the transformer 115, the converter 101 only carries a fraction of the line currents of the AC lines L1 and L2. As such, the transformer 115 reduces the current rating for the switches and other components of the dynamic AC line voltage regulator 100, thereby reducing cost.

Various embodiments are suitable for split-phase AC systems of various voltage and/or frequency levels such as 240 Volt AC systems at 60 Hz, or 240 Volt AC systems at 50 Hz. In the illustrated exemplary implementation, a distribution transformer 130 has a center-tapped secondary winding with +/−120 V, with the center tap being the neutral connection N. The transformer 130 is a distribution transformer that steps down a medium voltage to low voltage, which may be typically installed on the pole top or on a pad. In the illustrated example, the dynamic AC line voltage regulator 100 is coupled between the transformer 130 and the load 131, which receives the +/−120 volts normally. The dynamic AC line voltage regulator 100 injects a regulated voltage in series with the two lines L1 and L2. As such, voltages of the AC lines the L1 and L2 lines are regulated to a desired value.

In various embodiments, the output of the AC converter 101 is connected to an LC filter comprising an inductor 120 and a capacitor 121. The LC filter suppresses the switching harmonics, which result from operating the switches at a significantly higher rate than the fundamental grid frequency (i.e., $f_{switch} \gg f_{grid}$). Accordingly, the output voltage of a dynamic AC line voltage regulator may be synthesized at the same fundamental frequency. The primary winding 116 of the transformer 115 is coupled across the LC filter, such that only the fundamental frequency is let through to the secondary sides. The injected voltage may be in phase (additive) or in opposite phase (subtractive) with reference to the AC line voltages. The amount of voltage change possible is governed by the turns ratio (e.g., 20:1:1) of the transformer 115 and by the duty cycle D of the converter 101. In further embodiments, the winding connections of the transformer 115 may be configured such that the injected voltage is only in phase (additive) or in opposite phase (subtractive) with reference to the AC line voltages. The output voltages of the direct AC line voltage regulator 100 can be controlled over a desired range via regulation of the duty cycle D of the converter 101. Various embodiments may comprise a control module (e.g., the computing module 600 illustrated in FIG. 6) which determines the desired duty cycle and effects changes via various control loops.

In some embodiments, the converter 101 may comprise a thyristor pair (or triac) 122. Upon sensing an over-current situation, typically resulting from a downstream fault, the thyristor pair 122 may turn on. The line current can be effectively measured using a current transformer or other current sensor in series with a winding (e.g., the primary winding 116, the secondary winding 117, or the tertiary winding 118) of the transformer 115. When the thyristor pair 122 is turned on, the capacitor 121 is discharged, and the thyristor pair 122 provides a low-impedance path for the reflected fault current to flow. For instance, when the transformer turns ratio is 20:1:1, a 3000-Ampere fault current on the secondary winding 117 or the tertiary winding 118 may be reduced to a 150-Ampere on the primary winding 116. Upon detecting the thyristor pair 122 is turned on, the relay 124, can also be turned on. In various embodiments, the relay 124 is a 'normally closed' or NC relay, as it provides a passive automatic bypass in case the converter 101 fails. This improves the overall reliability of the system. Further, if the line voltage is within the nominal range and no voltage regulation is required, the converter 101 can be maintained off by keeping the relay 124 in its normally closed position, thus reducing losses.

Figure 2:
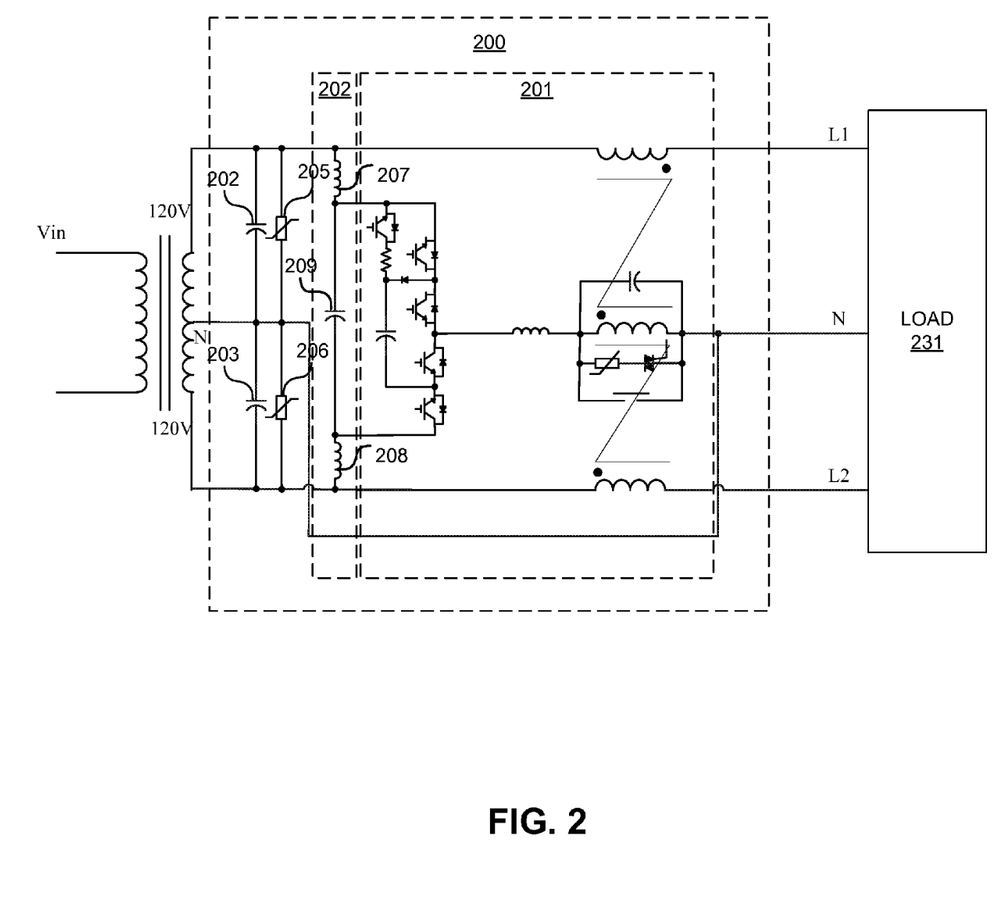
FIG. 2 illustrates an exemplary implementation of a dynamic AC line voltage regulator in accordance with an embodiment of the invention.

FIG. 2 illustrates an exemplary implementation of a dynamic AC line voltage regulator 200 in accordance with an embodiment of the invention. Similar to the dynamic AC line voltage regulator 100 illustrated in FIG. 1, the dynamic AC line voltage regulator 200 comprises an AC/AC converter 201, capacitors 202-204, and varistors 205-206. In addition, the dynamic AC line voltage regulator 200 comprises an Electromagnetic Interference (EMI) filter 202 comprising inductors 207-208 and the capacitor 209. One of ordinary skill in the art would appreciate that various embodiments may be applied to a single phase (not split) application or a three phase application without loss of generality.

Figure 3:
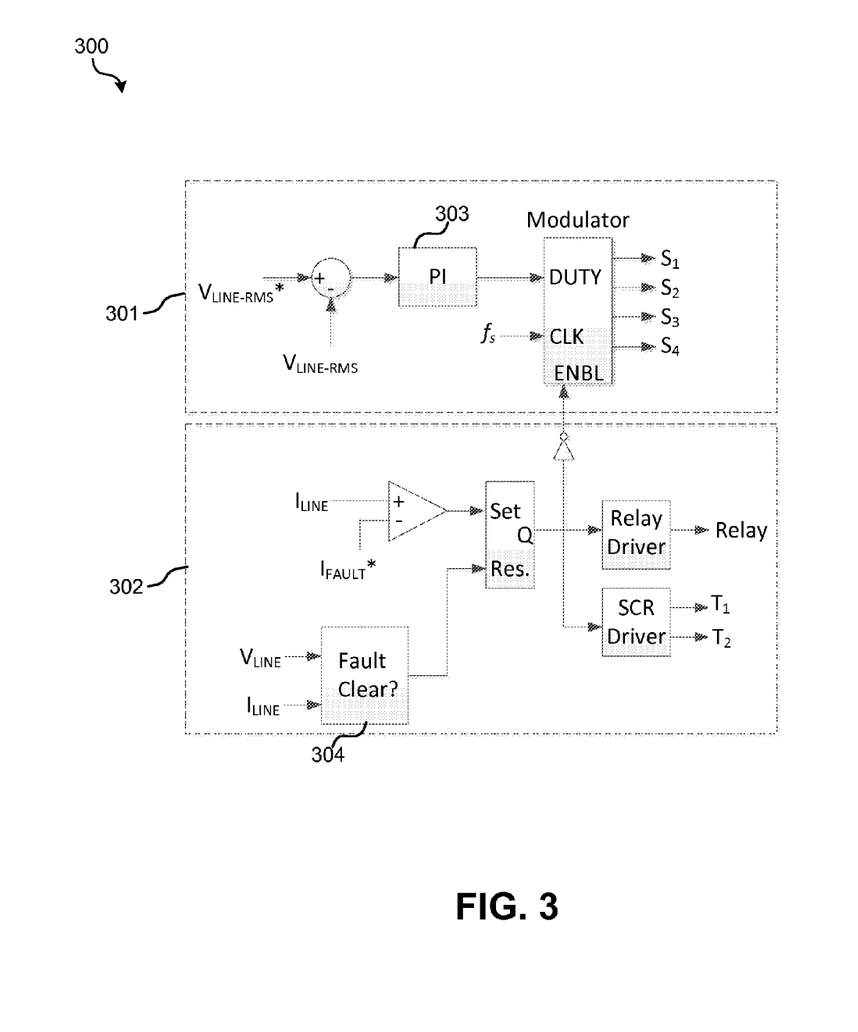
FIG. 3 illustrates control block diagrams of various embodiments of the invention.

FIG. 3 illustrates control block diagrams 300 of various embodiments of the invention. The illustrated control block diagrams 300 comprise a normal mode control loop 301 and a fault mode control loop 302. When a dynamic AC line voltage regulator operates normally (that is, the current and the voltage of the dynamic AC line voltage regulator are within the nominal ranges), the main switching devices (e.g., switches 110-113 in FIG. 1) of a dynamic AC line voltage regulator are controlled according to the normal mode control loop 301. In the normal mode control loop 301, the line voltage is measured and provided as inputs to a PI regulator 303.

The fault mode control loop 302, which is in parallel to the normal mode control loop 301, determines if the line current exceeds a threshold that indicates a fault has occurred, in which case, the relay and the thyristors of the dynamic AC line voltage regulator are turned on while the main switching devices of the dynamic AC line voltage regulator are disabled simultaneously. As such, the dynamic AC line voltage regulator operates under the fault mode. The fault mode may be cleared by a control block 304 that monitors the line voltage and line current and resets the controller to the normal mode control loop 301.

Various embodiments comprise an active AC snubber circuit to ensure a safe operation of the AC/AC converter of a dynamic AC line voltage regulator. As errors in measurements invariably exist that may lead to incorrect switch patterns causing large voltage spikes when a current path suddenly becomes open or causes a large and potentially detrimental, shoot-through when a capacitor is shorted. Further, in addition to use of a bypass switch, under a major fault, the AC switches must be turned off under local gate drive control to ensure protection. The active snubber circuit provides a free-wheeling path for the converter and ensures that that the converter is tolerant of both errors in measurement and timings and of faults. Moreover, the active snubber circuit may eliminate the zero crossing problems in AC/AC converters with AC switches controlled by sequenced communication strategies. In one embodiment, the active snubber circuit is implemented into the gate drivers of the switches.

Figure 4A:
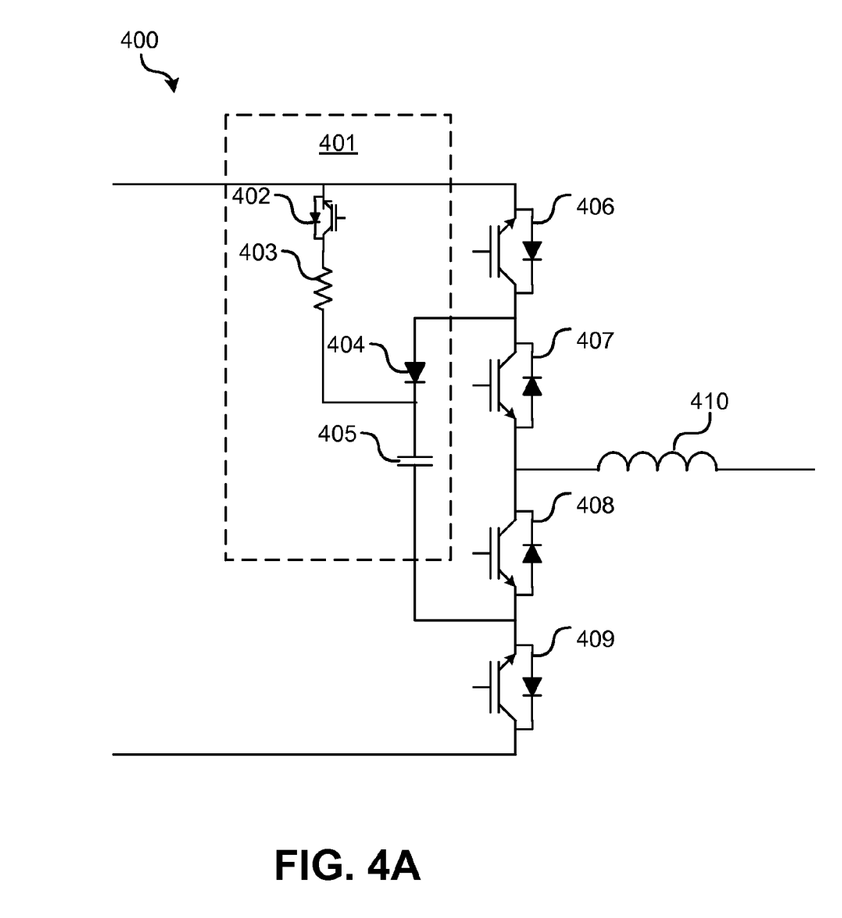
FIG. 4A illustrates an exemplary circuit diagram of an AC snubber.

FIG. 4A illustrates an exemplary circuit diagram of an AC snubber 401. The AC snubber 401 comprises a switch 402, a resistor 403, a diode 404, and a capacitor 405. The snubber capacitor 405 may synthesize an AC source that tracks the incoming AC line voltage (e.g., Vin in FIGS. 1 and 2). In one embodiment, the snubber capacitor 405 tracks the voltage when the polarity of the voltage is positive. As the line voltage reaches a peak value and begins to decrease, the switch 402 is controlled so as to discharge the capacitor 405 in a manner such that the voltage across the capacitor 405 essentially tracks the AC line voltage, but is controlled to be marginally higher than the line voltage value.

The AC snubber 401 may further comprise a control module that regulates the switching on and off of the switch 402 such that the snubber capacitor 405 provides a half-wave rectifier voltage. Further, the voltage spike on the output due to snubber operation may be eliminated by regulating the snubber voltage 401 appropriately, thus improving the total harmonic distortion (THD) of the converter of a dynamic AC line voltage regulator, thereby ensuring that volt-second balance across the output filter is well maintained.

Figure 4B:
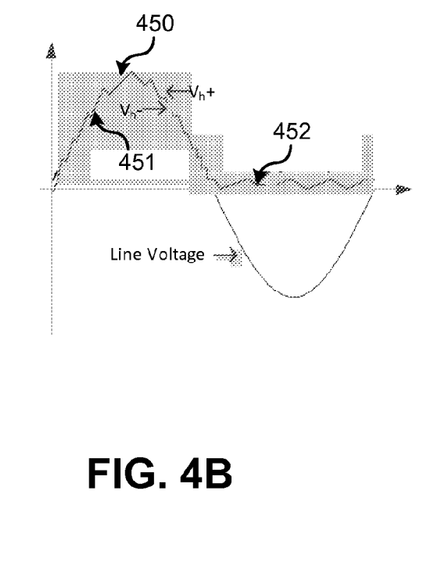
FIG. 4B depicts an exemplary waveform based on hysteresis-based control of the snubber capacitor voltage in accordance with an embodiment.

FIG. 4B depicts an exemplary waveform based on hysteresis-based control of the snubber capacitor voltage in accordance with an embodiment. The AC snubber operates entirely separate from the main controller of the converter of a dynamic AC line voltage regulator. The control is based on hysteresis control where the voltage across the snubber capacitor 405 is regulated within two bands through control of the switch 402.

As illustrated, the waveform 452 is the snubber voltage trajectory. Waveforms 450 and 451 are the upper and lower boundaries for defining the snubber voltage, respectively. The lower boundary is selected so that it is slightly higher than the half-wave of the AC input voltage in order to reverse bias the diode 404 during normal operation. The upper boundary is selected in accordance with the RC time constant associated with the resistor 403 and snubber capacitor 405 to provide a certain effective switching frequency while discharging the snubber capacitor 405. In one embodiment, the size of the snubber capacitor 405 is very small (e.g., in the order of 0.1 to 1 µF), the dissipated energy is typically a very small fraction of the total energy handled by the converter of a dynamic AC line voltage regulator.

In addition to the ability to restore a line voltage to a normal value (e.g., the nominal value), even as the incoming line voltage fluctuates, thus creating the desired environment for operation of connected loads and equipment; some embodiments may comprise an energy saving tracking module to track the variation of real and reactive power consumed when the voltage varies thereby providing energy saving tracking. For typical loads, a 1% drop in voltage may provide a 0.5-2% drop in power consumption. When these savings are integrated over longer periods, such as a month for utility billing purposes, sufficient energy savings may be obtained.

Figure 5A:
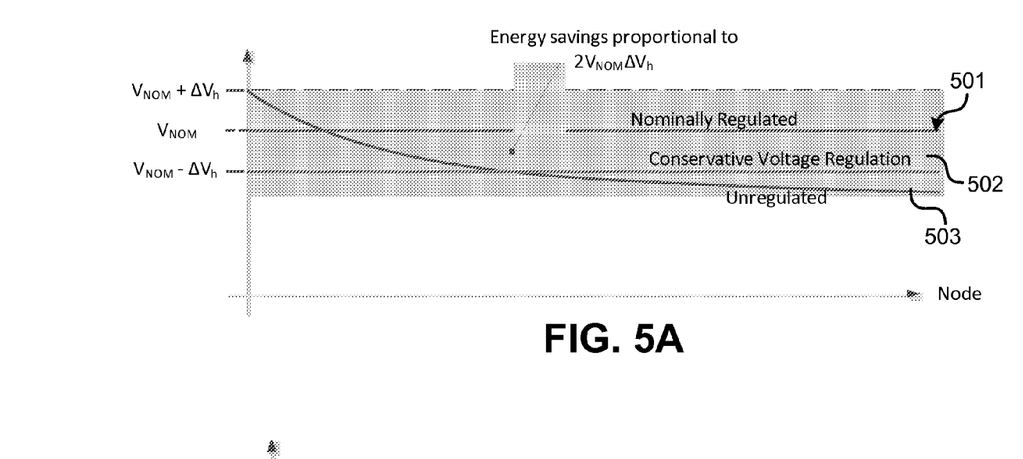
FIG. 5A illustrates an exemplary conservative voltage regulation to reduce energy consumption in accordance with an embodiment of the invention.

FIG. 5A illustrates an exemplary conservative voltage regulation to reduce energy consumption in accordance with an embodiment of the invention. As illustrated, the curve 501 depicts the nominal voltage $V_{NOM}$. The region 502 is the conservative voltage regulation (CVR), in which the line voltage is regulated between ($V_{NOM}-\Delta V_h$) and $V_{NOM}$. The curve 503 depicts an unregulated line voltage. The energy being saved, $$\frac{V_{NOM}^2}{\text{Load}} - \frac{(V_{NOM}-\Delta V_h)^2}{\text{Load}},$$

is proportional to $2*V_{NOM}*\Delta V_h$.

Various embodiments may measure and track the amount of power and energy consumption saved. In one embodiment, a dynamic AC line voltage regulator may be periodically turned off and on, and power consumption is measured in both scenarios. The voltage is shifted between the two values at a rate corresponding to the fastest load.

In further embodiments, a sensitivity metric (Sp and Sr) that measures the percent change in real (Sp) and reactive (Sr) power to a small imperceptible change (e.g., 1%) in line voltage, may be determined. The value for Sp can be computed periodically, or every time a change in load current is measured, indicating that a new load has been turned on or off. In one embodiment, Sp can be calibrated over longer periods (e.g., one hour) or when a substantial load change is detected. A dynamic AC line voltage regulator may change the voltage gradually to the nominal value, and then back to an optimal value (e.g., a value at which energy consumption is minimized.) This change takes place over a period of time which is short enough when compared to the overall energy consumption, and is undetectable to the customer because the rate of change is slow and the amount of change is small enough. This capability is demonstrated in FIG. 5B.

Figure 5B:
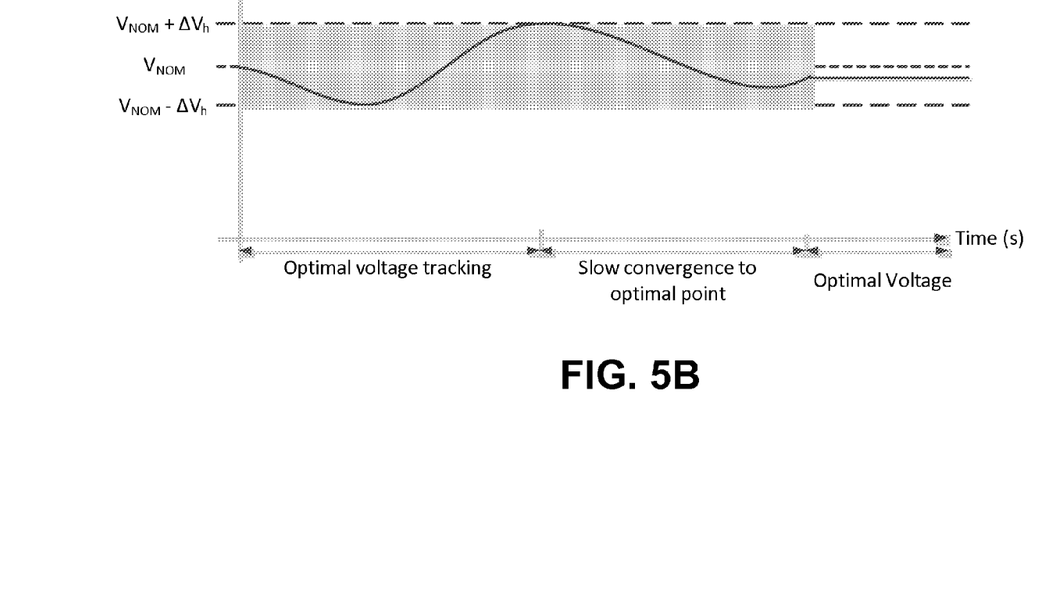
FIG. 5B illustrates an exemplary optimal voltage regulation point tracking and convergence in accordance with an embodiment of the invention.

FIG. 5B illustrates an exemplary optimal voltage regulation point tracking and convergence in accordance with an embodiment of the invention. As illustrated, in one embodiment, a dynamic AC line voltage regulator may sweep the line voltage very slowly (e.g., within 5 to 10 minutes time interval) over the allowed voltage band as dictated by such standards as American National Standards Institute (ANSI) (e.g. +/−5%). At each discrete voltage point, real and reactive power consumed by the load may be assessed. The dynamic AC line voltage regulator, upon completing the sweep of the voltage, determines a voltage point corresponding to the minimum power consumption by the load. Subsequently, the line voltage is slowly converged to the voltage point corresponding to the minimum load consumption. In various embodiments, with known sensitivity metric (Sp and Sr) and a calibrated load model, a dynamic AC line voltage regulator may estimate the actual real and reactive power reduction being realized.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

Figure 6:
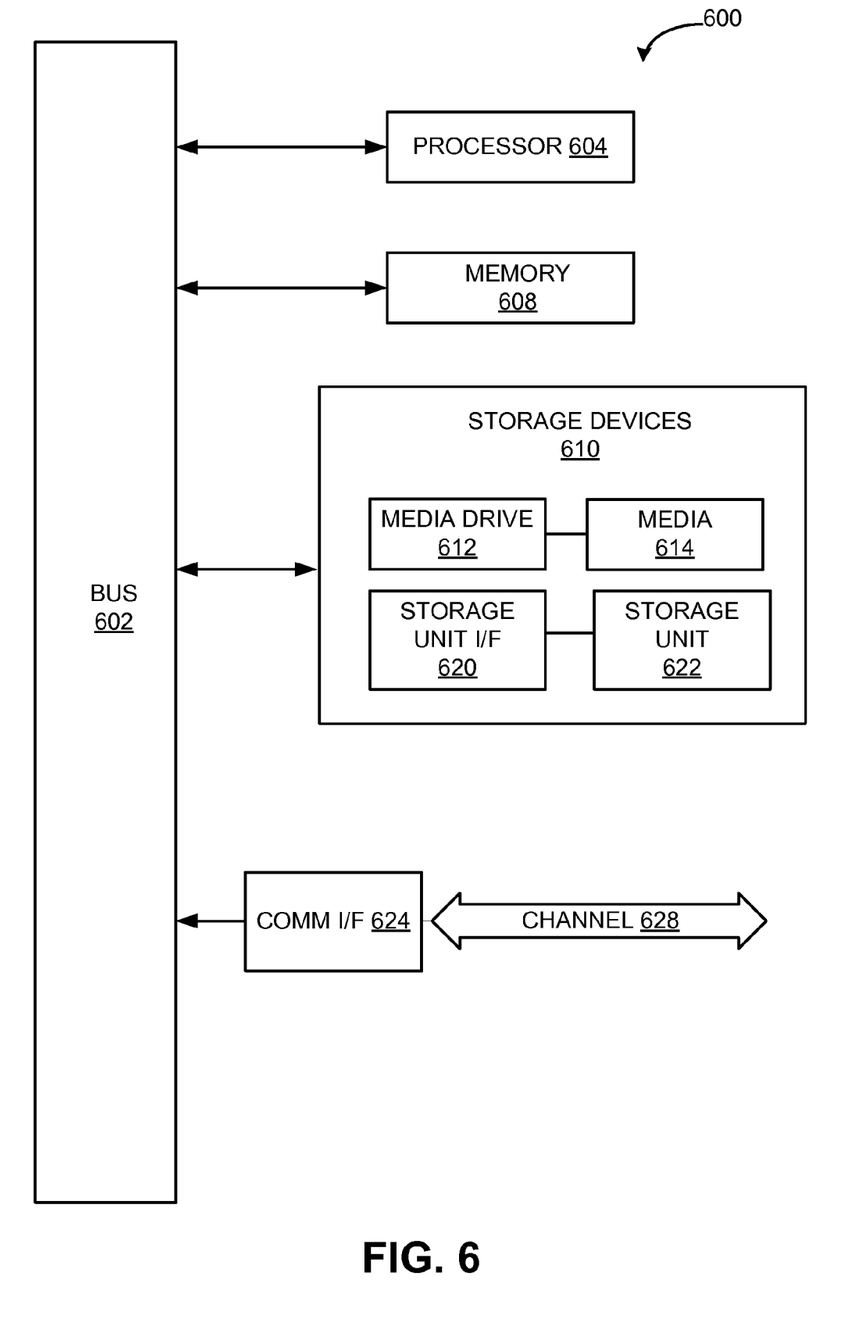
FIG. 6 illustrates an example computing module that may be used in implementing various features of embodiments of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 600. After reading this description, it will become apparent to a person skilled in the relevant art how to implement the invention using other computing modules or architectures.

Referring now to FIG. 6, computing module 600 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), or other removable or fixed media drive might be provided. Accordingly, storage media 814 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A voltage regulation system, comprising:
   a converter comprising
      a set of switches, and
      a transformer comprising a primary winding and a plurality of secondary windings, wherein each of the primary winding and the plurality of secondary windings couple to a distribution transformer, the primary winding further couples to a neutral line, and each of the plurality of secondary windings further couple to a corresponding AC line, such that the primary winding forms a parallel circuit with each of the plurality of secondary windings;
   wherein the primary winding has more turns than any of the plurality of secondary windings; and
   a control module regulating a duty cycle of the converter.

2. The voltage regulation system of claim 1, wherein the control module determines a duty cycle according to a desired voltage of an AC line, wherein the converter generates an additive or a subtractive voltage to be injected in series with the voltage of the AC line in response to the duty cycle of the converter.

3. The voltage regulation system of claim 1, wherein the control module comprises a first control loop and a second control loop in parallel to the first control loop.

4. The voltage regulation system of claim 3, wherein the set of switches are regulated according to the first control loop when the voltage and the current of the voltage regulation system are within a predetermined range.

5. The voltage regulation system of claim 3, further comprising a bypass switch coupled across the primary winding of the transformer, wherein the set of switches are disabled and the bypass switch is enabled according to the second control loop when a line current is above a threshold.

6. The voltage regulation system of claim 5, wherein the bypass switch comprises a thyristor pair and a relay.

7. The voltage regulation system of claim 1, further comprising an active snubber comprising a switch, a resistor, a diode, and a capacitor, wherein the voltage across the capacitor is regulated to track the incoming line voltage when the polarity of the incoming line voltage is positive.

8. The voltage regulation system of claim 1, wherein the voltage regulation system is coupled across a distribution transformer comprising a center-tapped secondary winding.

9. The voltage regulation system of claim 8, further comprising an electromagnetic interference (EMI) filter coupled to the distribution transformer.

10. The voltage regulation system of claim 1, further comprising an energy saving tracking module.

11. The voltage regulation system of claim 10, wherein the energy saving tracking module tracks a variation of real and reactive power consumed when the line voltage varies.

12. The voltage regulation system of claim 11, wherein the energy saving tracking module determines a sensitivity metric measuring the percent change in real and reactive power to a small imperceptible change in line voltage.

13. The voltage regulation system of claim 11, wherein the energy saving tracking module determines a voltage point corresponding to a minimum power consumption and regulates the line voltage to the voltage point.

14. The voltage regulation system of claim 1, wherein the primary winding has at least twice as many turns as any of the plurality of secondary windings.

15. The voltage regulation system of claim 1, wherein the primary winding has at least twenty times as many turns as any of the plurality of secondary windings.

* * * * *